US 8,185,758 B2

(12) United States Patent
Henroid et al.

(10) Patent No.: US 8,185,758 B2
(45) Date of Patent: May 22, 2012

(54) METHOD AND SYSTEM FOR DETERMINING AN ENERGY-EFFICIENT OPERATING POINT OF A PLATFORM

(75) Inventors: Andrew D. Henroid, Portland, OR (US); Eugene Gorbatov, Hillsboro, OR (US); Paul S. Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/173,497

(22) Filed: Jun. 30, 2011

(65) Prior Publication Data

US 2011/0264938 A1 Oct. 27, 2011

(51) Int. Cl.
*G06F 1/26* (2006.01)
(52) U.S. Cl. .................................... 713/300; 713/320
(58) Field of Classification Search .................. 713/300, 713/320
See application file for complete search history.

(56) References Cited

U.S. PATENT DOCUMENTS

| | | | | |
|---|---|---|---|---|
| 6,401,212 | B1* | 6/2002 | Bondi et al. ................. | 713/340 |
| 7,237,129 | B2* | 6/2007 | Fung ............................ | 713/323 |
| 7,318,164 | B2* | 1/2008 | Rawson, III ................. | 713/320 |
| 7,346,787 | B2* | 3/2008 | Vaidya et al. ................ | 713/300 |
| 7,788,519 | B2* | 8/2010 | Bailey et al. ................. | 713/500 |
| 8,006,082 | B2* | 8/2011 | Kinzhalin et al. ............ | 713/100 |
| 8,017,817 | B2* | 9/2011 | Rao et al. ..................... | 570/156 |
| 2001/0044909 | A1* | 11/2001 | Oh et al. ....................... | 713/600 |
| 2009/0235104 | A1* | 9/2009 | Fung ............................ | 713/324 |
| 2011/0022868 | A1* | 1/2011 | Harchol-Balter et al. .... | 713/323 |
| 2011/0029880 | A1* | 2/2011 | Neuse et al. .................. | 715/735 |
| 2011/0154321 | A1* | 6/2011 | Tian et al. .................... | 718/1 |

OTHER PUBLICATIONS

"Advanced Configuration and Power Interface Specification", Hewlett-Packard Corporation, Intel Corporation, Microsoft Corporation, Phoenix Technologies Ltd., Toshiba Corporation. Revision 3.0b, Oct. 10, 2006, 631 pages.

\* cited by examiner

*Primary Examiner* — Nitin Patel
(74) *Attorney, Agent, or Firm* — Blakely, Sokoloff, Taylor & Zafman LLP

(57) ABSTRACT

A method and system for determining an energy-efficient operating point of the platform or system. The platform has logic to dynamically manage setting(s) of the processing cores and/or platform components in the platform to achieve maximum system energy efficiency. By using the characteristics of the workload and/or platform to determine the optimum settings of the platform, the logic of the platform facilitates performance guarantees of the platform while minimizing the energy consumption of the processor core and/or platform. The logic of the platform identifies opportunities to run the processing cores at higher performance levels which decreases the execution time of the workload and transitions the platform to a low-power system idle state after the completion of the execution of the workload. Since the execution time of the workload is reduced, the platform spends more time in the low-power system idle state and therefore the overall system energy consumption is reduced.

18 Claims, 3 Drawing Sheets

310
$$Utilization_f = Utilization_{f_i} \times \frac{f_i}{ScalabilityFactor \times f + (1 - ScalabilityFactor) \times f_i}$$

320
$$Energy(f) = IdlePower \times \%IdleTime + ActivePower \times \%ActiveTime$$

330
$$Energy(f) = IdlePower \times (1 - \frac{Utilization * f_{min}}{ScalabilityFactor \times f + (1 - ScalabilityFactor) \times f_{min}})$$
$$+ (AF_1 \times f^2 + AF_2 \times f + AF_2) \times \frac{Utilization * f_{min}}{ScalabilityFactor \times f + (1 - ScalabilityFactor) \times f_{min}}$$

340
$$AF_1(ScalingFactor)f^2 + 2AF_2 f_{min}(1 - ScalingFactor)f + AF_2 f_{min}(1 - ScalingFactor)$$
$$- ScalingFactor(IdlePower - AF_2) = 0$$

300

310

$$Utilization_f = Utilization_{f_i} \times \frac{f_i}{ScalabilityFactor \times f + (1 - ScalabilityFactor) \times f_i}$$

320

$$Energy(f) = IdlePower \times \%IdleTime + ActivePower \times \%ActiveTime$$

330

$$Energy(f) = IdlePower \times \left(1 - \frac{Utilization * f_{min}}{ScalabilityFactor \times f + (1 - ScalabilityFactor) \times f_{min}}\right)$$
$$+ (AF_1 \times f^2 + AF_2 \times f + AF_2) \times \frac{Utilization * f_{min}}{ScalabilityFactor \times f + (1 - ScalabilityFactor) \times f_{min}}$$

340

$$AF_1(ScalingFactor)f^2 + 2AF_2 f_{min}(1 - ScalingFactor)f + AF_2 f_{min}(1 - ScalingFactor)$$
$$- ScalingFactor(IdlePower - AF_2) = 0$$

300                    FIG. 3

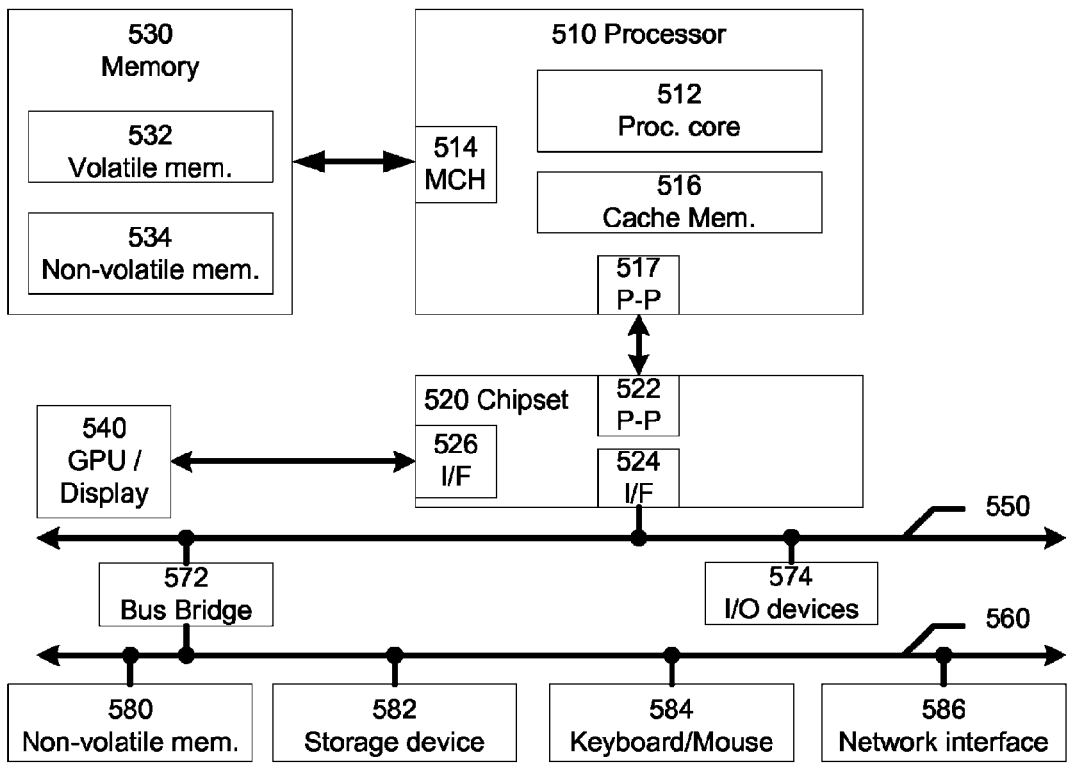

500                    FIG. 5 ethod and System for Determining an Energy-Efficient Operating Point of a Platform

FIELD OF THE INVENTION

This invention relates to a platform, and more specifically but not exclusively, to a method and system for determining an energy-efficient operating point of the platform.

BACKGROUND DESCRIPTION

Energy efficiency is one of the design goals across the spectrum of computing devices. Even though efforts have been devoted to reducing system power, energy-efficient performance still remains a first-order concern in enterprise datacenters.

Software managed dynamic voltage and frequency scaling (DVFS) algorithms often control processor frequency and voltage based solely on processor utilization. For example, in both Windows® and Linux based operating systems, the DVFS algorithms simply raise or lower processor frequency and voltage based on a utilization threshold. These algorithms rarely achieve optimal system energy-efficiency and it provides no performance guarantees for software workloads running on the system.

BRIEF DESCRIPTION OF THE DRAWINGS

The features and advantages of embodiments of the invention will become apparent from the following detailed description of the subject matter in which:

FIG. 3 illustrates equations for the dynamic power management policy in accordance with one embodiment of the invention;

FIG. 5 illustrates a system to implement the methods disclosed herein in accordance with one embodiment of the invention.

DETAILED DESCRIPTION

Figure 1:
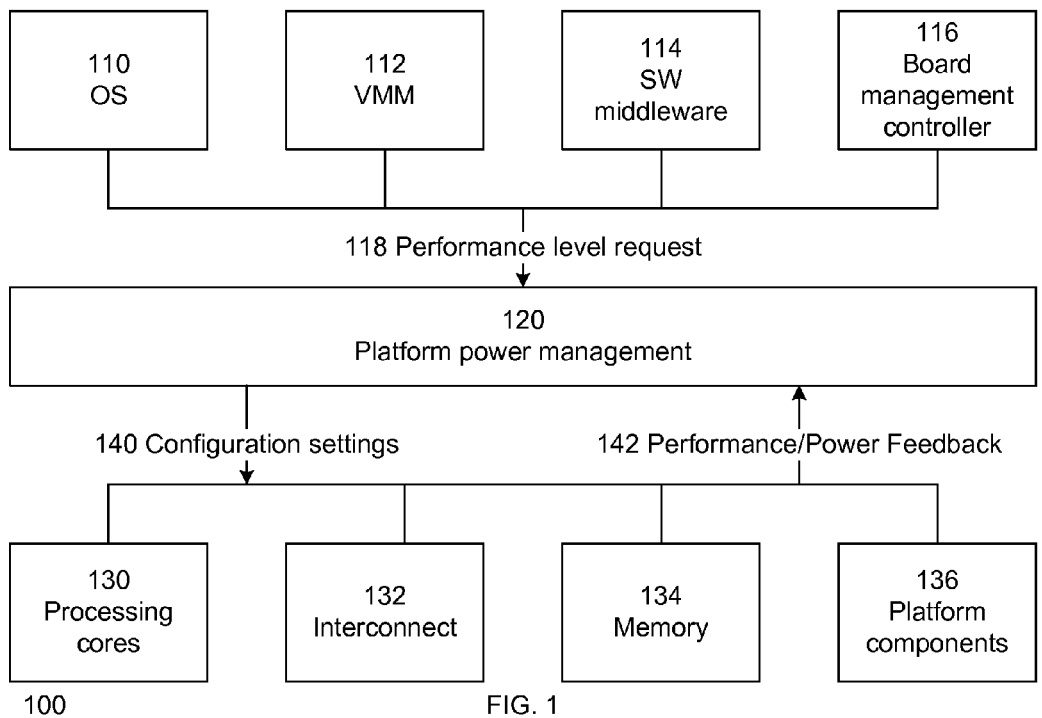
FIG. 1 illustrates a block diagram of platform power management logic in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system for determining an energy-efficient operating point of the platform or system. The platform has logic to dynamically manage or configure the settings of the processing cores and/or platform components to achieve maximum system energy efficiency in one embodiment of the invention.

For example, in one embodiment of the invention, the platform has logic to determine a characteristic(s) of a workload to be executed by a processing core. In another embodiment of the invention, the logic in the platform may also determine characteristic(s) of the platform having the processing core to execute the workload. Based on the determined characteristic(s) of the workload and/or platform, the logic determines setting(s) of the processing core to execute the workload. In one embodiment of the invention, the logic determines the setting(s) of the processing core that are to minimize an energy consumption of the processor core and/or platform while maintaining the performance level of the execution of the workload.

By using the characteristic(s) of the workload and/or platform to determine the optimum setting(s) of the platform, the logic of the platform facilitates performance guarantees of the platform while minimizing the energy consumption of the processor core and/or platform in one embodiment of the invention. The logic of the platform identifies opportunities to run the processing core(s) at higher performance levels that decreases the execution time of the workload. The logic of the platform transitions the platform to a low-power system idle state after the completion of the execution of the workload. Since the execution time of the workload is reduced, the platform spends more time in the low-power system idle state and therefore the overall system energy consumption is reduced in one embodiment of the invention.

In one embodiment of the invention, the setting of the processing core includes, but is not limited to, a clock frequency setting of the processing core, a setting of each of one or more input voltages of the processing core, an activation or deactivation of one or more logic blocks in the processing core, an activation or deactivation of one or more memory blocks in the processing core and any other setting of a platform component that affects the system power consumption.

FIG. 1 illustrates a block diagram of the platform power management logic 100 in accordance with one embodiment of the invention. The platform power management logic 100 has a close loop logic or controller that supports the dynamic configuration of the power settings of the platform and the other components of the platform. In one embodiment of the invention, a performance level request 110 is sent to the platform power management module 120 by a source including, but not limited to, an Operation System (OS) 110, a Virtual Machine Monitor (VMM) 112, a software (SW) middleware 114, and a board management controller 116. In another embodiment of the invention, the application sends the performance level request 110 to the platform power management module 120. One of ordinary skill in the relevant art will readily appreciate that the performance level request 110 can be sent by other modules in the platform without affecting the workings of the invention.

The platform power management module 120 receives the performance level request 110 and determines the characteristic(s) of the workload and/or the characteristic(s) of the platform to determine the configuration settings 140 of including, not limited to, the platform, the processing core(s) 130, the processor(s), the interconnect modules 132, the memory(ies) 134, integrated components, and other platform modules or components 136 in one embodiment of the invention. The platform uses the determined configuration settings 140 to configure the respective module in one embodiment of the invention. In one embodiment of the invention, the respective module sends the performance and/or power feedback 142 to the platform power management module 120 to dynamically adjust the configuration settings 140.

Figure 2:
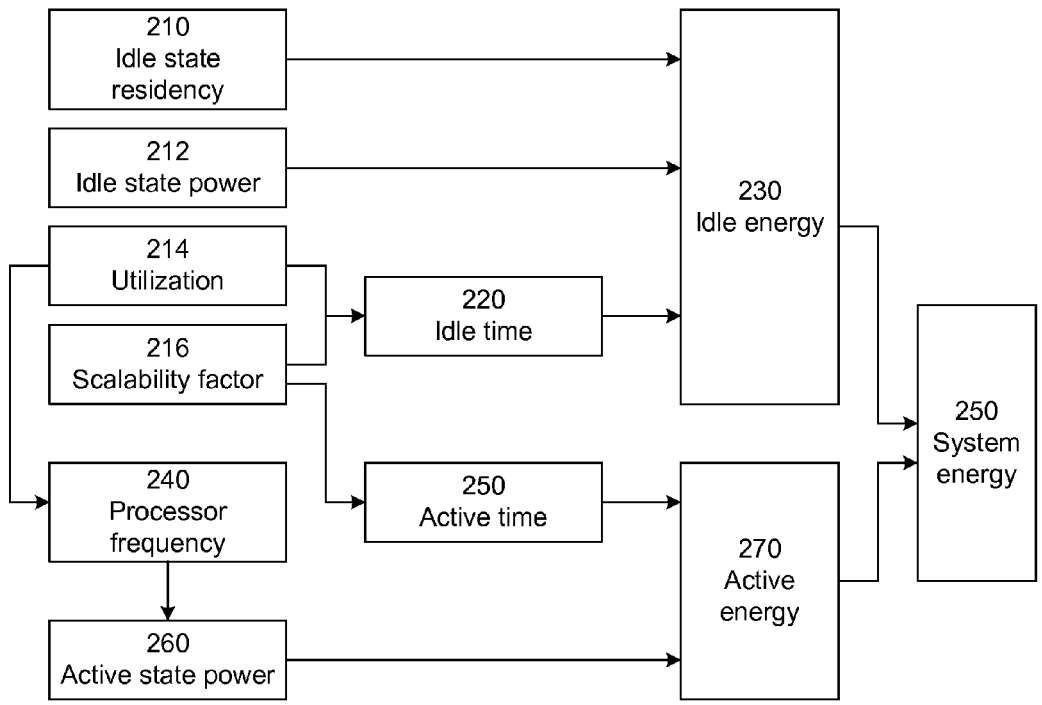
FIG. 2 illustrates a block diagram of a dynamic power management policy in accordance with one embodiment of the invention.

FIG. 2 illustrates a block diagram 200 of the dynamic power management policy in accordance with one embodiment of the invention. In one embodiment of the invention, the characteristics of the platform include, but are not limited to, the supported processor and system idle states and their power consumption, processor and system active states and their power consumption, platform power management policies and other features that affect the power consumption of the platform. The platform idle states include but are not limited to, processor sleep states (C-states), low power memory states such as a memory self-refresh state, Input/Output (I/O) link states such as link state L0s (L0s) and link state L1 (L1) and any other idle state of the platform.

The platform active states include, but are not limited to, processor performance states (P-states), memory frequency operating states (H-states), and I/O link-width modulation states such as L0p and any other active state of the platform. In one embodiment of the invention, the characteristics of the platform include performance features or capabilities including, but not limited to, the pipeline width, speculation, heterogeneous cores, cache memory sizes, Interconnect frequencies, and the like.

In one embodiment of the invention, the logic of the platform determines the system energy 250 of the platform by determining the idle energy 230 and the active energy 270 of the platform required to execute a particular workload or task. In one embodiment of the invention, the idle energy 230 is determined based on, but not limited to, the idle state residency 210, the idle state power 212 and the idle time 220.

In one embodiment of the invention, the idle state residency captures or measures the ability of the platform to enter the various idle states based on the specific workload characteristics such as, but not limited to, distribution of idle intervals, inter-arrival time of I/O requests or memory access patterns of the workload. The idle state power 212 of the platform is a function of the idle state residency 210 and it measures the power consumption of the platform in an idle state in one embodiment of the invention.

The idle time 220 of the platform is dependent on, but not limited to, the workload utilization 214 and the workload scalability factor 216. The workload utilization 214 indicates the proportion of time where the workload is running or active in the system. The workload frequency scalability or scalability factor 216 is a value between 0 and 1 that measures how the workload execution time scales with the operating frequency of the processor core in one embodiment of the invention. In another embodiment of the invention, the workload frequency scalability or scalability factor 216 is determined based on the performance features or capabilities of the platform.

For example, in one embodiment of the invention, workloads with instruction and data working sets that fit well in the in-core resources such as, but not limited to, cache memories, floating point units and the like, have a workload scalability factor 216 that approaches 1 as the execution time for these workloads scales linearly with frequency.

For workloads that are limited by accesses to off-core resources such as, but not limited to, memories external to the processing core and the like, have a workload scalability factor 216 that approaches 0 as running these workloads at higher clock frequencies or higher voltages of the processing core for example, has little or no effect on the execution time.

The active energy 270 of the platform is dependent on, but not limited to, the active time 250 and the active state power 260 in one embodiment of the invention. The active time 250 is dependent on the workload scalability factor 216 in one embodiment of the invention. The active state power 260 is dependent on the processor frequency 240 which in turn in dependent on the workload utilization 214 in one embodiment of the invention. In another embodiment of the invention, the active state power 260 is dependent on other performance feature(s) of the platform.

Once the logic has determined the system energy 250 of the platform to execute a particular workload, it determines the optimum frequency and voltage to operate the processor to execute the particular workload in one embodiment of the invention. One of ordinary skill in the relevant art will readily appreciate that other factors may be used to determine the system energy 250 and these other factors can be used without affecting the workings of the invention. The block diagram 200 of the dynamic power management policy is not meant to be limiting. Different performance settings or configurations can also be determined based on the system energy 250 of the platform to execute a particular workload in one embodiment of the invention.

FIG. 3 illustrates equations 300 for the dynamic power management policy in accordance with one embodiment of the invention. For clarity of illustration, FIG. 3 is discussed with reference to FIG. 2. Equation 310 illustrates how to determine the workload utilization 214 of the workload at a frequency f in one embodiment of the invention. Equation 310 illustrates the relationship among the workload utilization 214 at frequency f (depicted as $Utilization_f$), the workload scalability factor 216 (depicted as ScalabilityFactor), current operating frequency $f_i$, and the workload utilization 214 at frequency $f_i$ (depicted as $Utilization_{fi}$).

Equation 320 illustrates how to determine the system energy 250 of the platform to execute a particular workload. Equation 320 illustrates the relationship among the system energy 250 (depicted as Energy(f)), the idle state power 212 (depicted as IdlePower), the idle time 220 (depicted as percentage of idle time, % IdleTime), the active state power 260 (depicted as ActivePower), the active time 250 (depicted as percentage of active time, % ActiveTime).

In one embodiment of the invention, the processor active state power 260 is a second degree polynomial and the equation 320 can be re-written in the form of equation 330. The activity factor (depicted as $AF_i$) is a set of constants calibrated to a specific platform and class of workloads and it represents how the system active state power 260 scales with the processor frequency f. In one embodiment of the invention, the frequency $f_{min}$ is an input parameter for the equation 330 and the equation 330 solves for the frequency f that minimizes the system energy 250.

The equation 340 is the first derivative of the energy equation 330 and solving equation 340 for the frequency f gives us the most energy efficient operating point in one embodiment of the invention. The input parameters for the equations are measured during the execution of the workload in one embodiment of the invention. In another embodiment of the invention, the input parameters for the equations are determined prior to the execution of the workload.

The equations 300 use the input parameters to search for the frequency of the processing core(s) that achieves the minimum system energy in one embodiment of the invention. One of ordinary skill in the relevant art will readily appreciate how to determine the appropriate voltage to be supplied to the processing core(s) based on the minimum frequency that will minimize the system energy and the determination of the appropriate voltage shall not be described herein.

The equations 300 described are not meant to be limiting. One of ordinary skill in the relevant will readily appreciate other ways of determining the settings of the processing core based on the platform and/or workload characteristics to determine an energy-efficient operating point for the processor. These other ways of determining the settings of the processing core can be used without affecting the workings of the invention. One of ordinary skill in the relevant will readily appreciate how to use other equations or other ways to determine the optimal setting(s) of the performance feature(s) of the platform that achieves the minimum system energy in one embodiment of the invention and shall not be described herein.

Figure 4:
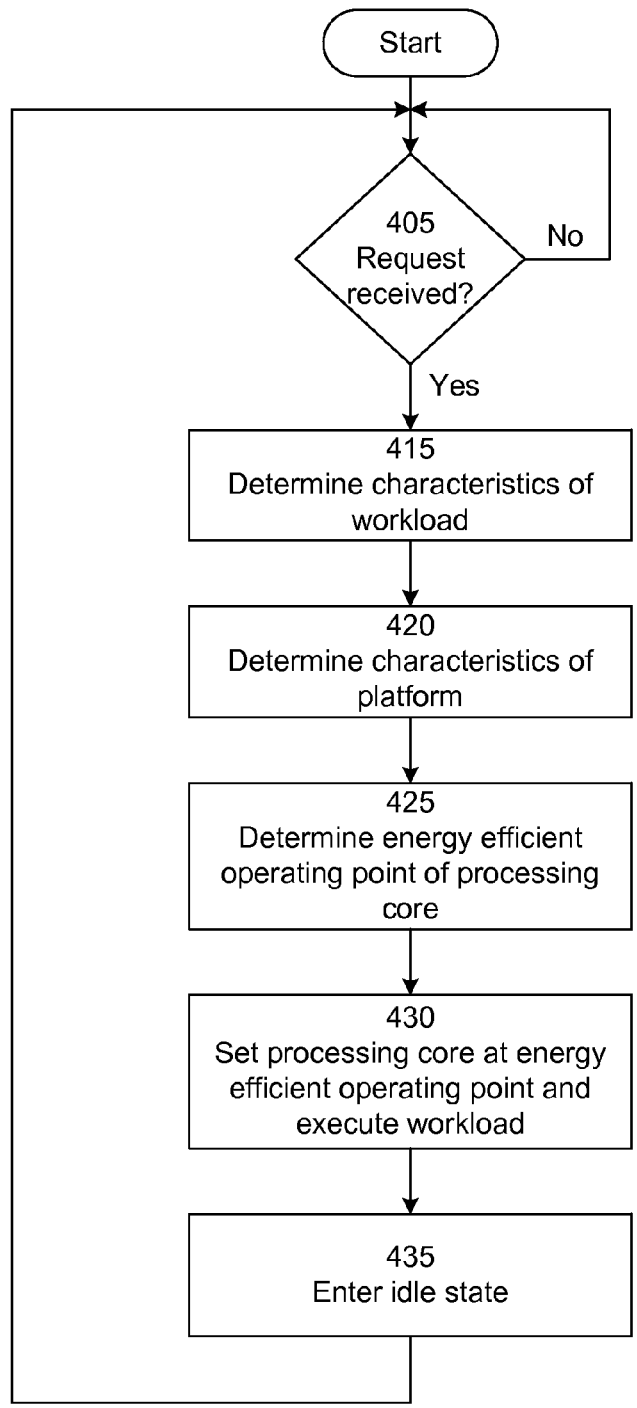
FIG. 4 illustrates a flow chart for the dynamic power management policy in accordance with one embodiment of the invention.

FIG. 4 illustrates a flow chart 400 for the dynamic power management policy in accordance with one embodiment of the invention. In one embodiment of the invention, the operating system or application issues a performance level request of a platform based on the demands or requirements of a workload. In one embodiment of the invention, the performance level request is a processor frequency (P-state) request.

In step 405, the flow 400 checks whether the request has been received. In step 415, the flow 400 determines the characteristics of the workload. In step 420, the flow 400 determines the characteristics of the platform. In step 425, the flow 400 determines the most energy efficient operating point of the processor core based on the determined characteristics of the workload and/or the determined characteristics of the platform. In one embodiment of the invention, step 425 determines the frequency of the processing core. In another embodiment of the invention, step 425 determines the voltage of the processing core. In yet another embodiment of the invention, step 425 determines any other settings that minimize the system energy of the processing core and/or system.

In step 430, the flow 400 sets the processing core and/or platform at the energy efficient operating point determined in step 425 and executes the workload. In step 435, the flow 400 enters an idle state once the workload is executed and the flow goes back to the step 405. In one embodiment of the invention, the flow 400 allows the platform to enter and remain the idle state for a longer time.

The flow 400 allows a determination of the optimum setting where the platform is in a state that gives equal or greater performance while minimizing the system energy consumption in one embodiment of the invention. The flow 400 configures the platform and the processing core(s) to run at the determined optimum setting in one embodiment of the invention.

The flow 400 is not meant to be limiting and it is an illustration on how to determine and configure the most energy-efficient operating point of one component of the platform: the processor core. The flow 400 can also be used to determine and configure the most energy-efficient operating point of other components of the platform. One of ordinary skill in the relevant art will readily appreciate how to use the flow 400 to determine and configure the most energy-efficient operating point of other components of the platform and it shall not be described herein.

FIG. 5 illustrates a system or platform 500 to implement the methods disclosed herein in accordance with one embodiment of the invention. The system 500 includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the system 500 used to implement the methods disclosed herein may be a system on a chip (SOC) system.

The processor 510 has a processing core 512 to execute instructions of the system 500. The processing core 512 includes, but is not limited to, pre-fetch logic to fetch instructions, decode logic to decode the instructions, execution logic to execute instructions and the like. The processor 510 has a cache memory 516 to cache instructions and/or data of the system 500. In another embodiment of the invention, the cache memory 516 includes, but is not limited to, level one, level two and level three, cache memory or any other configuration of the cache memory within the processor 510. In one embodiment of the invention, the processor 510 has the dynamic power management logic to determine the optimum setting where the system 500 is in a state that gives equal or greater performance while minimizing the system energy consumption in one embodiment of the invention.

The memory control hub (MCH) 514 performs functions that enable the processor 510 to access and communicate with a memory 530 that includes a volatile memory 532 and/or a non-volatile memory 534. The volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 534 includes, but is not limited to, NAND flash memory, phase change memory (PCM), read only memory (ROM), electrically erasable programmable read only memory (EEPROM), or any other type of non-volatile memory device.

The memory 530 stores information and instructions to be executed by the processor 510. The memory 530 may also stores temporary variables or other intermediate information while the processor 510 is executing instructions. The chipset 520 connects with the processor 510 via Point-to-Point (PtP) interfaces 417 and 522. The chipset 520 enables the processor 510 to connect to other modules in the system 500. In another embodiment of the invention, the chipset 520 is a platform controller hub (PCH). In one embodiment of the invention, the interfaces 517 and 522 operate in accordance with a PtP communication protocol such as the Intel® QuickPath Interconnect (QPI) or the like. The chipset 520 connects to a GPU or a display device 540 that includes, but is not limited to, liquid crystal display (LCD), cathode ray tube (CRT) display, or any other form of visual display device. In another embodiment of the invention, the GPU 540 is not connected to the chipset 520 and is part of the processor 510 (not shown).

In addition, the chipset 520 connects to one or more buses 550 and 560 that interconnect the various modules 574, 580, 582, 584, and 586. Buses 550 and 560 may be interconnected together via a bus bridge 572 if there is a mismatch in bus speed or communication protocol. The chipset 520 couples with, but is not limited to, a non-volatile memory 580, a mass storage device(s) 582, a keyboard/mouse 584 and a network interface 586. The mass storage device 582 includes, but is not limited to, a solid state drive, a hard disk drive, an universal serial bus flash memory drive, or any other form of computer data storage medium. The network interface 586 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. The system 500 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
   logic to:
      receive a request to execute a workload;
      determine one or more characteristics of a platform comprising the apparatus;
      determine one or more characteristics of the workload, wherein the one or more workload characteristics comprise one or more of a proportion of execution time of the workload, a scaling factor of the execution of the workload with the one or more operating points for the apparatus, and an ability of the platform to enter an idle state of the apparatus based on one or more of a distribution of idle intervals of the workload, an inter-arrival time of input/output (I/O) requests, and an inter-arrival time of memory access patterns; and
      determine one or more energy-efficient operating points of the apparatus based on the determined one or more characteristics of the workload and the determined one or more characteristics of the platform comprising the apparatus.

2. The apparatus of claim 1, wherein the logic to determine the one or more energy-efficient operating points of the apparatus based on the determined one or more characteristics of the workload and the determined one or more characteristics of the platform comprising the apparatus is to determine a minimum operating frequency of the apparatus based on the determined one or more characteristics of the workload and platform that achieves a minimum energy consumption of the platform.

3. The apparatus of claim 1, wherein the one or more energy-efficient operating points comprise one or more of a frequency setting of the apparatus, a setting of each of one or more input voltages of the apparatus, an activation or deactivation of one or more logic blocks in the apparatus, and an activation or deactivation of one or more memory blocks in the apparatus.

4. The apparatus of claim 1, wherein the one or more characteristics of the platform comprise one or more of an idle state of the apparatus, an idle state of the platform, power consumption of the apparatus in the idle state, power consumption of the platform in the idle state, an active state of the apparatus, an active state of the platform, power consumption of the apparatus in the active state, power consumption of the platform in the active state, and power management policy of the platform.

5. The apparatus of claim 4, wherein the idle state of the platform comprises one of a sleep state of the apparatus, a power down state of memory modules in the platform, and a power down link state of communication links in the platform.

6. The apparatus of claim 4, wherein the active state of the platform comprises one of an active state of the apparatus, an active operating state of memory modules in the platform, and an active link state of communication links in the platform.

7. A method comprising:
   receiving a request to execute a workload;
   determining one or more characteristics of a platform comprising a processing unit, wherein the processing unit is to execute the workload;
   determine one or more characteristics of the workload, wherein the one or more workload characteristics comprise one or more of a proportion of execution time of the workload, a scaling factor of the execution of the workload with the one or more operating points for the processing unit, and an ability of the platform to enter an idle state of the processing unit based on one or more of a distribution of idle intervals of the workload, an inter-arrival time of input/output (I/O) requests, and an inter-arrival time of memory access patterns; and
   determining one or more energy-efficient operating points of the processing unit based on the determined one or more characteristics of the workload and the determined one or more characteristics of the platform comprising the processing unit.

8. The method of claim 7, wherein the one or more energy-efficient operating settings comprise one or more of a frequency setting of the processing unit, a setting of each of one or more input voltages of the processing unit, an activation or deactivation of one or more logic blocks in the processing unit, and an activation or deactivation of one or more memory blocks in the processing unit.

9. The method of claim 7, wherein the one or more characteristics of the platform comprise one or more of an idle state of the processing unit, an idle state of the platform, power consumption of the processing unit in the idle state, power consumption of the platform in the idle state, an active state of the processing unit, an active state of the platform, power consumption of the processing unit in the active state, power consumption of the platform in the active state, and power management policy of the platform.

10. The method of claim 9, wherein the idle state of the platform comprises one of a sleep state of the processing unit, a power down state of memory modules in the platform, and a power down link state of communication links in the platform.

11. The method of claim 9, wherein the active state of the platform comprises one of a performance state of the processing unit, an active operating state of memory modules in the platform, and an active link state of communication links in the platform.

12. The method of claim 7, wherein the one or more workload characteristics further comprise one or more of an utilization of the processing unit, and an idle state residency of the processing unit.

13. A system comprising:
a memory; and
a processing core having logic to:
receive a request to execute a workload;
determine one or more characteristics of the system;
determine one or more characteristics of the workload, wherein the one or more workload characteristics comprise one or more of a proportion of execution time of the workload, a scaling factor of the execution of the workload with the one or more operating points for the processing core, and an ability of the system to enter an idle state of the processing core based on one or more of a distribution of idle intervals of the workload, an inter-arrival time of input/output (I/O) requests, and an inter-arrival time of memory access patterns; and
determine one or more energy-efficient operating points of the processing core based on the determined one or more characteristics of the workload and the determined one or more characteristics of the system.

14. The system of claim 13, wherein the logic to determine the one or more energy-efficient operating points of the processing core based on the determined one or more characteristics of the workload and the determined one or more characteristics of the system is to determine a minimum operating frequency of the processing core based on the determined one or more characteristics of the workload and system that achieves a minimum energy consumption of the system.

15. The system of claim 13, wherein the one or more energy-efficient operating points comprise one or more of a frequency setting of the processing core, a setting of each of one or more input voltages of the processing core, an activation or deactivation of one or more logic blocks in the processing core, and an activation or deactivation of one or more memory blocks in the processing core.

16. The system of claim 13, wherein the one or more characteristics of the system comprise one or more of an idle state of the processing core, an idle state of the system, power consumption of the processing core in the idle state, power consumption of the system in the idle state, an active state of the processing core, an active state of the system, power consumption of the processing core in the active state, power consumption of the system in the active state, and power management policy of the system.

17. The system of claim 16, wherein the idle state of the system comprises one of a sleep state of the processing core, a power down state of the memory, and a power down link state of communication links in the system.

18. The system of claim 16, wherein the active state of the system comprises one of an active state of the processing core, an active operating state of the memory, and an active link state of communication links in the system.

* * * * *